United States Patent [19]

Easley, Jr.

[11] 4,354,520

[45] Oct. 19, 1982

[54] PRESSURE/DEMAND EXHALATION VALVE

[75] Inventor: Othel D. Easley, Jr., Houston, Tex.

[73] Assignee: Reactor Services International, Inc., Alvin, Tex.

[21] Appl. No.: 256,602

[22] Filed: Apr. 22, 1981

[51] Int. Cl.³ .............................................. C16K 15/06
[52] U.S. Cl. ........................... 137/543.23; 128/205.24; 128/207.12; 137/DIG. 9
[58] Field of Search ....................... 128/201.28, 205.24, 128/206.15, 207.12; 137/543.23, DIG. 9, 543.21

[56] References Cited

U.S. PATENT DOCUMENTS

| | | | |
|---|---|---|---|
| 1,162,416 | 11/1915 | Teter | 128/207.12 |
| 3,393,702 | 7/1968 | Ferrill | 137/543.21 |
| 4,276,877 | 7/1981 | Gdulla | 128/201.28 |

FOREIGN PATENT DOCUMENTS

| | | | |
|---|---|---|---|
| 1092737 | 4/1955 | France | 137/543.23 |
| 9823 | of 1884 | United Kingdom | 137/543.23 |

Primary Examiner—Henry J. Recla

[57] ABSTRACT

An exhaust valve with a valve member inside a housing capable of seating with a valve seat so that the contact is between the edge of the valve member and the seat, the valve member being capable of limited play within the housing, with an adjustable maximum fail open position and adjustable valve opening pressure.

11 Claims, 5 Drawing Figures

PRESSURE/DEMAND EXHALATION VALVE

BACKGROUND OF THE INVENTION

In many industrial situations there is a need to protect the workers from the surrounding atmosphere. This is especially true when workers are forced to work inside large vessels such as chemical reactors or petroleum crackers. The atmosphere in which the worker is forced to work may be low in oxygen or could be immediately hazardous to life (contain poisonous gases) and in such situations the workers are required to wear air-purifying or atmosphere-supplying respirators.

The preferred type of protection for situations where the atmosphere is immediately hazardous to life and health or when the contaminant has poor warning properties is the atmosphere-supplying respirator. There are two general types of atmosphere-supplying respirators: (1) self-contained breathing apparatus, where the wearer carries his oxygen supply with him and (2) supplied-air apparatus, where the oxygen source is stationary and attached to the respirator wearer by a flexible hose.

The self-contained breathing apparatus can be either a closed-circuit or an open-circuit type. With a closed-circuit system the wearer's exhaust gases are passed through a system for removing the carbon dioxide and replenishing the used oxygen. The wearer "rebreathes" part of the original gases.

The open-circuit breathing apparatus is one where the wearer exhales used gases into the surrounding atmosphere. Open-circuit self-contained breathing systems and supplied air systems are similar in that both are available as either "demand" or "pressure-demand" systems.

An open-circuit demand system has a regulator which has an admission valve which is closed as long as positive pressure is maintained in the face plate. Inhalation (or demand) opens the admission valve to admit oxygen containing gases.

The pressure-demand system is very similar except there is always a positive pressure of breathing gas within the mask. The gases would continually flow out of the face piece except in a pressure-demand system there is a special exhalation or exhaust valve that maintains about 1-3 inches of water positive pressure in the face piece. This exhalation valve opens only when the pressure exceeds the backpressure, i.e., when the wearer exhales.

The open-circuit pressure-demand full face piece system is considered the system which gives the maximum protection, yet the system is no better than the reliability of the special exhalation valve. The exhalation valve fits into the face piece and is subject to a number of things which may cause it to malfunction. Dirt and debris can get into the exhalation valve and lodge between the valve and the seat preventing it from closing or dirt could get in the stem hole and prevent the valve from opening and/or closing. This is especially true when (because of ice or dirt) the pressure is not applied uniformly across the valve face causing the valve stem to stick in the stem hole. The improved exhalation valve of the present invention overcomes these disadvantages of the existing valves and offers a number of new advantages.

SUMMARY OF THE INVENTION

The invention relates to an improved pressure-demand respirator exhalation valve where the valve member and its spring or biasing means are enclosed in a housing. The invention relates to a valve where the pressure needed to open the valve is adjustable. The invention relates to a valve where even if the valve fails open it will restrict flow and maintain a positive minimum pressure and where, the maximum open position is adjustable. The invention relates to a valve where the valve seat is made of deformable or resilient material and the diameter of the valve seat and valve member are such that the outer edge of the member contacts the seat between the inner edge of the seat's circumference and the center of the seat's circumference. The invention relates to a valve where the valve stem hole or channel has an inner lip through which the stem passes, closest to the seat and the end of the valve stem furthest from the valve is tapered inward.

DESCRIPTION OF THE PREFERRED EMBODIMENTS

The invention will be described in detail by referring to the figures.

Figure 1:
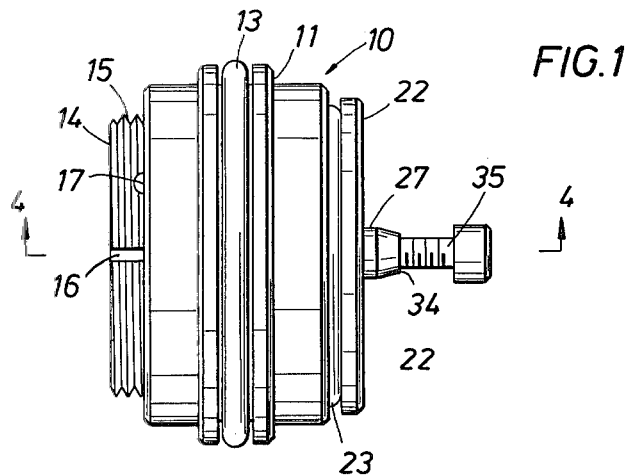
FIG. 1 is a side view of the exhalation valve.
Figure 4:
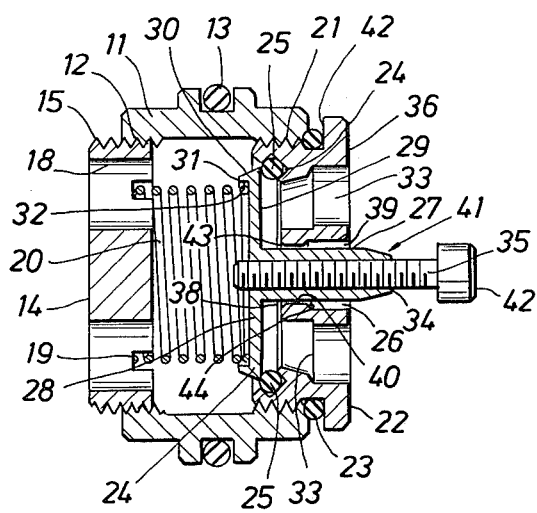
FIG. 4 is a view of FIG. 1 cut along 4—4'.

FIGS. 1 and 4 are side views of the improved demand-pressure respirator, exhalation or exhaust valve 10 showing a valve housing or casing 11. The housing 11 is preferably a symetrical cylinder with open ends having plate attachment means 12 for attaching plates to both ends. The preferred embodiment has a set of threads 12 on the inside of each end of the housing 11. Around the outside (preferably the middle) of the housing 11 is a valve gasket 13 which forms the seal when the valve 10 is inserted into the face piece and prevents gases from passing between the face piece and the valve 10.

Figure 2:
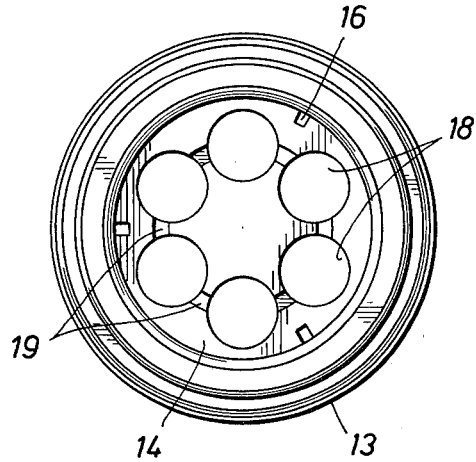
FIG. 2 is a view inside the valve housing through the opening left by removing the entrance plate, valve member and spring.

At one end of the housing 11 is an exit plate 14 (FIG. 2) attached to the housing 11 by exit plate housing attachment means 15 for attaching the exit plate 14 to the housing 11. The preferred exit plate attachment means 15 are threads on the outside edge of a circular plate adapted to fit in threads 12 on the inside of the housing 11. In the preferred embodiment the exit plate 14 has at least one, preferably three weep grooves 16 in the edge extending toward the center of the plate so that condensation or water may flow out of the housing 11. When the exit plate housing attachment means 12 are threads, it is advantageous to have a plastic plug 17 inserted into the outer edge of the exit plate 14 to make contact with the threads 12 of the housing 11 thereby securing the exit plate 14 inside the housing 11. At least one, preferably between one and about 8, most preferably about 6 exit plate holes or openings 18 pass through the faces of the exit plate 14 so that when attached to the housing 11, there is open communication between the inside of the housing 11 and the surroundings through the opening 18 on the faces of the exit plate 14.

In a preferred embodiment the inside face of the exit plate 14 has a circular groove 19 adapted to receive and hold one end of the spring 20 in place on the inside face of the exit plate 14.

Figure 3:
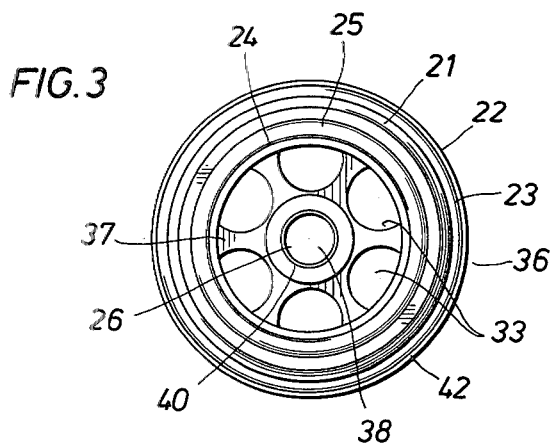
FIG. 3 is a view of the inside face of the entrance plate.

On the opposite end of the housing 11 there is an entrance plate 36, (FIG. 3) preferably a circular plate having an entrance plate housing attachment means 21, preferably threads on the outer edge of the entrance plate 36.

The outer edge of the outer face 22 of the plate 36 forms an entrance plate flange 42 against which an entrance plate gasket or o-ring 23 forms the seal between the end of the housing 11 and the entrance plate 36. The inner face 37 of the entrance plate 36 forms a circular valve seat flange 24. The cross-sectional shape of this flange is preferably rectangular. The valve seat flange 24 holds a valve seat or o-ring 25 made of a deformable or resilient material such as rubber. The center of the entrance plate 36 and the valve seat flange 24 has a valve stem guide hole 26 through which the valve stem 27 moves.

In an preferred embodiment of the invention the valve stem guide hole 26 has an inner lip 40 at the inside entrance 38 of the valve stem guide hole 26. This lip 40 makes the inside entrance 38 smaller than the outside entrance 39 which is the same diameter as the rest of the guide hole 26. The sides 43 and 44 of the lip 40 are preferably rounded or sloped so as to make the crown of the lip 40 smaller than the base. The valve stem 27, while having a diameter less than the diameter of the inside entrance 38 (diameter of the entrance formed by the lip 40), is even smaller in diameter relative to the rest of the valve stem guide hole 26. This gives the valve stem 27 a pivot point about the lip 40 and therefore creates some play in the movement of the valve member 28 about a line drawn through the center of the guide hole 26. As the valve member 28 slides toward the valve seat 25, the magnitude of that play is diminished.

Figure 5:
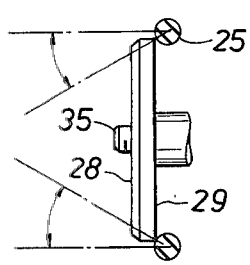
FIG. 5 is a close-up of the valve member and its seat.

As shown in FIGS. 4 and 5, the diameter of the valve member seat face 29 is about equal to, preferably less than the mean diameter across the valve seat 25 and greater than the mean inner diameter of the valve seat 25. The outer edge of the valve member seat face 29 contacts the valve seat 25 so that a line drawn through the cross-sectional center of the valve seat 25 and the point of contact between the valve seat 25 and seat face 29 would intersect with and form an acute angle with a second line drawn through the cross-sectional center of the valve seat, parallel to the length of the stem guide hole 26, measured from the second line, in front of the point of contact, toward a line through the valve stem guide hole of between about 0 and about 80 degrees, preferably between about 5 and about 60 and most preferably between about 5 and about 45 degrees. As a consequence, the first part of the valve member 28 to contact the valve seat 25 is the outer edge of the valve seat face 29.

The cross-sectional shape of the valve seat 25 is shown as round but the cross-sectional shape may be any convenient shape as long as a sealing contact may be made between the valve seat 25 and the outer edge of the seat face 29. The ratio of diameter of stem 27 to length of the stem guide hole 26 is between about 2.5–4.0 to 1.

In a preferred embodiment of the invention, the diameter of the valve stem 27 is about 0.15 to 0.17 inches and about 0.01 to about 0.03 inches, preferably 0.0175 inches less than the diameter across the outer entrance 39 to the valve stem guide hole 26 and about 0.003 to about 0.009, preferably 0.005 to 0.007, most preferably 0.006 inches less than the diameter across the inside entrance 38 (the lip 40) of the guide hole 26. The length across the inner face or crown of the lip 40 is between about 0.030 and about 0.070, preferably between about 0.040 and about 0.060 inches. The lip has a rounded edge at entrance 38, preferably between about 0.018 to about 0.024 radius. The end 41 of the stem opposite the valve member is beveled inward to avoid binding between the stem 27 and the inner surface of the valve stem guide hole 26. The slope of the bevel is between about 12 and about 17 degrees.

The length of the valve stem guide hole 26 is about 0.21 and about 0.29 inches, preferably between about 0.23 and about 0.25 inches. Because of the play of the stem 27 in the guide hole 26, the stem 27 is less likely to bind in the stem hole 26 than the existing valves if and when a foreign object is in the system and interferes with either opening or closing.

The valve seat 25 is made of rubber or a rubber like or resilient material and the seating of the valve member 28 deforms the valve seat 25. The edge contact, the rubber seat and the play between the stem 27 and the stem hole 26 allow the valve to function when small pieces of foreign matter get between the valve member 28 and the valve seat 25.

The side or circumference 30 of the valve member 28 may form a right angle with the face 29 (as in FIG. 5) or preferably slopes, inwardly, away from the valve seat 25 (as in FIG. 4), so as to sharpen the edge of the valve member seat face 29 which first contacts the valve seat 25. The spring face 31 of the valve member 28 has a spring holding means 32, a groove or ridge, for holding the spring in place. The tension or pressure holding the valve shut is adjustable by screwing the exit plate 14 further into the housing 11 and compressing the spring 20.

The entrance plate 36 has at least one, preferably between one and about 8, most preferably about 6 entrance plate gas openings 33, running from the outer face 22 to the inner face 34 of the entrance plate 36 so that there is communication between the inside of the valve housing 11 and the surroundings through the entrance plate 36 when the valve is open.

The stem 26 is attached to the center of the seat face 29 of the valve member 28 and extends perpendicular to the seat face 29 to a length such that when the spring face 31 of the valve member 28 rests on the inside face of the exit plate 14, the end 41 of the stem 27 is still in or partially in the stem hole 26. When the valve member 28 is up against the seat 25, the stem 27 extends past the outside face 22 of the entrance plate 36. The stem 27 has an adjustment screw hole 34 running the length of the stem 27 and through the valve member 28 so that there is open communication through the stem 27 and valve member 28 between the inside of the housing 11 and the surroundings. The adjustment stem screw hole 34 has threads on the inside surface adapted to receive an adjustment stem hole screw 35 with threads on it. In a preferred embodiment, the adjustment screw 35 is longer than the stem adjustment screw hole 34. When the adjustment screw 35 is screwed into the adjustment screw hole 34, it seals the hole 34 and can be screwed into the hole 34 so that a part of the screw 35 extends past the spring or outer face 31 of the valve member 28. The length to which the screw 35 extends past the spring face 31 determines the maximum distance the valve member 28 can move away from the valve seat 25 and prevents the valve member 28 from interfering with the exit plate holes 18. In another embodiment the stem hole screw 35 is short but has a head 42 larger than the guide stem hole 26 and the contact between the head 42 and entrance 39 determines the opening between the valve stem 25 and the valve member 28.

In operation, the exhalation valve is set in the helmet or face piece so that the entrance plate 36 is on the inside of the face piece and the gasket 13 sealingly attaches the exhaust valve to the face piece. The spring 20 holds the valve member 28 closed against the seat 25 with a pressure between about 1 and about 5, preferably between about 1 and about 3 inches of water, pressure just slightly greater than the pressure constantly delivered by the pressure-demand regulator. This is adjustable by screwing the exit plate 14 further into the housing 11 and compressing the spring 20. When the wearer inhales, i.e., demands oxygen containing gas, the regulator supplies it and the exhaust valve 10 remains closed, the valve member 28 seated against the seat 25, preventing gases from the surrounding atmosphere from entering the face piece. When the wearer exhales the pressure against the seat face 29 of the valve member 28 overcomes the spring 20 pressure, the valve member 28 moves away from the seat 25, the stem 27 moving within the stem hole 26. The length of screw 35 which has been adjusted to extend past the spring face 31 of the valve member 28 influences the size of the opening through which exhaled gases may pass and insures that the valve member 28 will not block or partially block the holes 18 in the exit plate 14. The size of the opening between the valve member 28 and the valve seat 25 and between the valve member 28 and the inside of the housing 11 (the former usually being smaller than the latter) is such that even if the valve fails open, there is still some resistance pressure (greater than about 0.78 inches of $H_2O$ pressure) to the free flow of gases across the face piece. When the wearer finishes exhaling, the spring 20 forces the valve closed (the valve member 28 against the seat 25) and the wearer is ready to demand more oxygen.

the end plates are preferably made of anodized aluminum, while all of the other parts are preferably made of stainless steel, except the gaskets or o-rings which are made of an elastomer.

I claim as my invention:

1. An exhaust valve comprising:
    (a) A cylindrical valve housing with open ends having threads on the inside surface of each end and having a gasket incircling the outside of the housing for attaching the valve;
    (b) A circular exit plate having threads around the outer circumference, attached thereby to one end of the housing, the exit plate having at least one exit opening through the circular faces of the exit plate allowing communication between the inside of the housing and the outside of the housing;
    (c) A circular entrance plate having threads running around the circumference, attached thereby to the end of the housing opposite the exit plate, an entrance plate flange near the outer face of the entrance plate running around the circumference of the exit plate, an entrance plate gasket against the flange forming a seal between the entrance plate and the housing, a circular valve seat flange on the inside face of the entrance plate with a valve seat made of a resilient material in the valve seat flange, at least one entrance plate opening running from the inner face to the outer face of the entrance plate, allowing communication between the space inside the housing, within the circular valve seat flange, and the space outside of the housing, a valve stem guide hole running from the inner face to the outer face of the entrance plate at the center of the valve seat flange, the valve stem guide hole having a lip forming the entrance to the inner face, the diameter across the lip being less than the diameter of the remainder of the valve stem guide hole;
    (d) A cylindrical valve member inside the housing having an inner face with a diameter between about equal to the mean diameter across the valve seat and greater than the inside diameter across the valve seat, a valve stem attached at one end to the center of the inner face of the valve member extending perpendicular to the inner face of the valve member into the valve stem hole, said valve stem having a stem diameter slightly less than the diameter across the lip, except at the end not attached to the valve member which is beveled, the length of the valve stem is such that when the valve is open, the beveled end of the stem is inside the valve stem guide hole, the valve stem and valve member having a stem screw hole running the length of the stem and through the valve member from face to face, said stem screw hole having threads on its inner surface adapted to receive a screw, a valve stem screw having threads adapted so as to screw into the stem screw hole and seal said hole, the length of said valve stem screw being such that the maximum opening of the valve is determined by adjusting the depth of which the valve stem screw is screwed into the stem screw hole;
    (e) A biasing means for holding the valve member sealingly against the valve seat, one end of said biasing means contacting the outer face of the valve member.

2. The exhaust valve of claim 1 where the biasing means is a coil spring, one end in contact with the inner face of the exit plate, the other end in contact with the outer face of the valve member.

3. The exhaust valve of claim 2 where the spring exerts a positive pressure to seal the valve member against the valve seat of between about 1 and about 3 inches of water pressure.

4. The exhaust valve of claim 2 where there is a circular groove on the inner face of the exit plate holding one end of the coil spring and a circular groove on the outer face of the valve member holding the other end of the coil spring.

5. The exhaust valve of claim 1 or 3 where the exit plate has at least one weep groove in the circumference edge running from face to face so that when screwed into the housing the groove forms a weep opening through the exit plate at the housing allowing condensation to flow from inside of the housing to the outside of the housing.

6. The exhaust valve of claim 5 where there are at least three weep grooves.

7. The exhaust valve of claim 5 where the exit plate has six exit plate openings.

8. The exhaust valve of claim 7 where the entrance plate has six entrance plate openings.

9. The exhaust valve of claim 8 where the exit plate has a plastic plug means in the circumference edge for fixing the depth to which the exit plate is screwed into the housing and adjusting the positive pressure exerted by the spring.

10. The exhaust valve of claim 9 where the end of the stem screw extends past the outer face of the valve member and strikes the inner face of the exit plate to determine the maximum opening between the valve member and the valve seat.

11. The exhaust valve of claim 9 where the stem screw has a head on the outside side of the entrance plate, said head being larger than the valve stem guide hole and inserted into the stem screw hole to a depth such that the contact between the head and the entrance plate around the stem guide hole determines the maximum opening between the valve member and the valve seat.

* * * * *